United States Patent
Lu et al.

(10) Patent No.: US 11,126,306 B2
(45) Date of Patent: *Sep. 21, 2021

(54) OPTICAL TOUCH APPARATUS AND WIDTH DETECTING METHOD THEREOF

(71) Applicant: Wistron Corporation, New Taipei (TW)

(72) Inventors: Kuo-Hsien Lu, New Taipei (TW); Yu-Yen Chen, New Taipei (TW)

(73) Assignee: Wistron Corporation, New Taipei (TW)

(*) Notice: Subject to any disclaimer, the term of this patent is extended or adjusted under 35 U.S.C. 154(b) by 0 days.

This patent is subject to a terminal disclaimer.

(21) Appl. No.: 16/901,013

(22) Filed: Jun. 15, 2020

(65) Prior Publication Data

US 2020/0310593 A1 Oct. 1, 2020

Related U.S. Application Data

(63) Continuation of application No. 14/873,216, filed on Oct. 2, 2015, now Pat. No. 10,719,174.

(30) Foreign Application Priority Data

Jun. 25, 2015 (TW) .................................. 104120504

(51) Int. Cl.
*G06F 3/042* (2006.01)
*G06K 9/00* (2006.01)
*G06F 3/01* (2006.01)

(52) U.S. Cl.
CPC ............ *G06F 3/0428* (2013.01); *G06F 3/018* (2013.01); *G06K 9/00543* (2013.01); *G06K 9/00375* (2013.01); *G06K 2209/401* (2013.01)

(58) Field of Classification Search
CPC .......... G06F 3/042–0428; G06F 3/018; G06K 9/00375; G06K 9/00543; G06K 2209/401
See application file for complete search history.

(56) References Cited

U.S. PATENT DOCUMENTS

| | | | | | |
|---|---|---|---|---|---|
| 4,545,018 | A | * | 10/1985 | Clements | ............... B23K 26/21 700/166 |
| 2005/0162633 | A1 | * | 7/2005 | Kasai | .................. G03F 7/70975 355/69 |

(Continued)

*Primary Examiner* — Alexander Eisen
*Assistant Examiner* — Nathaniel P Brittingham
(74) *Attorney, Agent, or Firm* — JCIPRNET (57) ABSTRACT

An optical touch apparatus and a width detecting method thereof are provided. The optical touch apparatus includes at least two sensing components, a light emitting component, and a width detecting module. The sensing components are configured to sense a touch object located on a touch plane. The light emitting component is configured to be a light source of the touch plane and is disposed adjacent to one of the sensing components. The width detecting module is coupled to the light emitting component and the other of the sensing components. The light emitting component is controlled by the width detecting module to emit a light. The other of the sensing components is controlled by the width detecting module to sense intensity of the light. The width detecting module detects a distance between the sensing components according to the sensed intensity of the light.

14 Claims, 6 Drawing Sheets

(56) References Cited

U.S. PATENT DOCUMENTS

| | | | |
|---|---|---|---|
| 2013/0126492 A1* | 5/2013 | Mori | B23K 26/03 219/121.83 |
| 2013/0135462 A1* | 5/2013 | Chen | G06T 7/73 348/135 |
| 2013/0141389 A1* | 6/2013 | Chou | G06F 3/0425 345/175 |
| 2013/0249867 A1* | 9/2013 | Chou | G06F 3/0425 345/175 |
| 2014/0071424 A1* | 3/2014 | Dunne | G01C 3/04 356/3 |

\* cited by examiner

OPTICAL TOUCH APPARATUS AND WIDTH DETECTING METHOD THEREOF

CROSS-REFERENCE TO RELATED APPLICATION

This application is a continuation application of and claims the priority benefit of a prior application Ser. No. 14/873,216, filed on Oct. 2, 2015 which claims Taiwan application serial no. 104120504, filed on Jun. 25, 2015. The entirety of each of the above-mentioned patent applications is hereby incorporated by reference herein and made a part of this specification.

BACKGROUND OF THE INVENTION

Field of the Invention

The invention relates to a touch apparatus, and more particularly to an optical touch apparatus and a width detecting method thereof.

Description of Related Art

Generally, in an optical touch screen, a plurality of optical lenses are disposed on an edge of the screen to capture images of operation of a touch object on the screen. Next, in the captured images, a shadow cast by the touch object on an optical touch plane due to a shielding effect or a bright spot generated due to a reflection effect is analyzed, so as to obtain relative angles between the touch object and the optical lenses. Finally, a precise position of the touch object is obtained through triangulation based on a distance between the optical lenses.

The optical lenses are usually fixed on both ends of an optical touch apparatus, and the distance between the optical lenses is usually constant. Thus, the optical touch apparatus can only be applied to a screen having a fixed size. To enable application of the optical touch apparatus to screens of different sizes, the optical touch apparatus may be designed to be expandable. In other words, the distance between the optical lenses in the expandable optical touch apparatus is adjustable. However, a user has to adjust a width of the expandable optical touch apparatus according to the screens of different sizes, and to manually measure the distance between the optical lenses. Then, the user needs to manually input the measured distance between the optical lenses to the expandable optical touch apparatus, so as enable the expandable optical touch apparatus to precisely calculate a position of the touch object. Accordingly, extreme inconvenience in use is caused.

SUMMARY OF THE INVENTION

In view of the above, the invention provides an optical touch apparatus and a width detecting method thereof. The optical touch apparatus has an adjustable width and is thus suitable for use with touch planes or touch panels of different sizes. In addition, the optical touch apparatus is capable of automatically detecting the adjusted width so that the convenience in use is improved.

The optical touch apparatus of the invention includes at least two sensing components, a light emitting component, and a width detecting module. The sensing components are configured to sense a touch object located on a touch plane. The light emitting component is configured to be a light source of the touch plane and is disposed adjacent to one of the sensing components. The width detecting module is coupled to the light emitting component and the other of the sensing components. The light emitting component is controlled by the width detecting module to emit a light. The other of the sensing components is controlled by the width detecting module to sense intensity of the light. The width detecting module detects a distance between the sensing components according to the sensed intensity of the light.

In one embodiment of the invention, the width detecting module includes a light projecting module, an image capturing module and a computing module. The light projecting module is coupled to the light emitting component so as to control the light emitting component to emit the light. The image capturing module is coupled to the other of the sensing components so as to control the other of the sensing components to reflect the intensity of the light to obtain an image. The computing module is coupled to the image capturing module so as to receive the image, calculates a width of a waveform according to the image, and obtains the distance between the sensing components according to the width of the waveform. The width of the waveform is a view angle range in which the sensed intensity of the light is not zero.

In one embodiment of the invention, the computing module looks up in at least one lookup table or calculates the distance between the sensing components according to the width of the waveform.

In one embodiment of the invention, the width detecting module further includes a storage module. The storage module is coupled to the computing module and is configured to store the at least one lookup table. The lookup table is configured to record a relationship between the width of the waveform and the distance between the sensing components in a situation with the intensity of the light and a specific exposure time. The lookup table corresponds to a number of times of use of the optical touch apparatus or ambient brightness of the environment where the optical touch apparatus is located, and the number of times of use is associated with a degree of attenuation in intensity of the light emitting component.

In one embodiment of the invention, the computing module substitutes the width of the waveform into a curve formula so as calculate the distance between the sensing components. The curve formula is an expression showing the relationship between the width of the waveform and the distance between the sensing components under the conditions including the intensity of the light and the specific exposure time. Moreover, the curve formula includes an intensity attenuation coefficient of the light emitting component or a brightness parameter of the environment where the optical touch apparatus is located.

In one embodiment of the invention, the width detecting module includes a light projecting module, an image capturing module and a computing module. The light projecting module is coupled to the light emitting component so as to control the light emitting component to emit the light. The image capturing module is coupled to the other of the sensing components so as to control the other of the sensing components to reflect the intensity of the light to obtain an image. The computing module is coupled to the image capturing module so as to receive the image, calculates a peak value of a waveform according to the image, and obtains the distance between the sensing components according to the peak value of the waveform. The peak value of the waveform is the sensed intensity of the light.

In one embodiment of the invention, the computing module looks up in at least one lookup table or calculates the distance between the sensing components according to the peak value of the waveform.

In one embodiment of the invention, the width detecting module further includes a storage module. The storage module is coupled to the computing module and is configured to store the at least one lookup table. The lookup table is configured to record a relationship between the peak value of the waveform and the distance between the sensing components in a situation with the intensity of the light and a specific exposure time. The lookup table corresponds to a number of times of use of the optical touch apparatus or ambient brightness of the environment where the optical touch apparatus is located, and the number of times of use is associated with a degree of attenuation in intensity of the light emitting component.

In one embodiment of the invention, the computing module substitutes the peak value of the waveform into a curve formula so as calculate the distance between the sensing components. The curve formula is an expression showing the relationship between the peak value of the waveform and the distance between the sensing components under the conditions including the intensity of the light and the specific exposure time. Moreover, the curve formula includes an intensity attenuation coefficient of the light emitting component or a brightness parameter of the environment where the optical touch apparatus is located.

In one embodiment of the invention, when the optical touch apparatus is re-activated, the width detecting module re-detects the distance between the sensing components.

In one embodiment of the invention, when the optical touch apparatus is in operation, the width detecting module continuously detects the distance between the sensing components.

In one embodiment of the invention, the optical touch apparatus further includes an expandable support. The sensing components are respectively disposed on both ends of the expandable support, and the expandable support is configured to adjust the distance between the sensing components.

In a width detecting method of the optical touch apparatus of the invention, at least two sensing components of the optical touch apparatus are configured to sense a touch object located on a touch plane. Moreover, a light emitting component of the optical touch apparatus is configured to be a light source of the touch plane. The width detecting method of the optical touch apparatus includes the following steps. The light emitting component is controlled to emit a light, wherein the light emitting component is disposed adjacent to one of the sensing components. Intensity of the light is sensed by the other of the sensing components. A distance between the sensing components is detected according to the sensed intensity of the light.

In one embodiment of the invention, the step of sensing the intensity of the light by the other of the sensing components includes the following step. The other of the sensing components is controlled to reflect the intensity of the light to obtain an image. The step of detecting the distance between the sensing components according to the sensed intensity of the light includes the following steps. A width of a waveform is calculated according to the image. The distance between the sensing components is obtained according to the width of the waveform. The width of the waveform is a view angle range in which the sensed intensity of the light is not zero.

In one embodiment of the invention, the step of obtaining the distance between the sensing components according to the width of the waveform includes the following step. The distance between the sensing components is obtained by looking up in at least one lookup table or calculating according to the width of the waveform.

In one embodiment of the invention, the width detecting method of the optical touch apparatus further includes the following step. The lookup table is established and stored in advance. The lookup table is configured to record a relationship between the width of the waveform and the distance between the sensing components in a situation with the intensity of the light and a specific exposure time. The lookup table corresponds to a number of times of use of the optical touch apparatus or ambient brightness of the environment where the optical touch apparatus is located, and the number of times of use is associated with a degree of attenuation in intensity of the light emitting component.

In one embodiment of the invention, the step of obtaining the distance between the sensing components according to the width of the waveform includes the following step. The distance between the sensing components is calculated by substituting the width of the waveform into a curve formula. The curve formula is an expression showing the relationship between the width of the waveform and the distance between the sensing components under the conditions including the intensity of the light and the specific exposure time. Moreover, the curve formula includes an intensity attenuation coefficient of the light emitting component or a brightness parameter of the environment where the optical touch apparatus is located.

In one embodiment of the invention, the step of sensing the intensity of the light by the other of the sensing components includes the following step. The other of the sensing components is controlled to reflect the intensity of the light to obtain an image. The step of detecting the distance between the sensing components according to the sensed intensity of the light includes the following steps. A peak value of a waveform is calculated according to the image. The distance between the sensing components is obtained according to the peak value of the waveform. The peak value of the waveform is the sensed intensity of the light.

In one embodiment of the invention, the step of obtaining the distance between the sensing components according to the peak value of the waveform includes the following step. The distance between the sensing components is obtained by looking up in at least one lookup table or calculating according to the peak value of the waveform.

In one embodiment of the invention, the width detecting method of the optical touch apparatus further includes the following step. The lookup table is established and stored in advance. The lookup table is configured to record a relationship between the peak value of the waveform and the distance between the sensing components in a situation with the intensity of the light and a specific exposure time. The lookup table corresponds to a number of times of use of the optical touch apparatus or ambient brightness of the environment where the optical touch apparatus is located, and the number of times of use is associated with a degree of attenuation in intensity of the light emitting component.

In one embodiment of the invention, the step of obtaining the distance between the sensing components according to the peak value of the waveform includes the following step. The distance between the sensing components is calculated by substituting the peak value of the waveform into a curve formula. The curve formula is an expression showing the relationship between the peak value of the waveform and the distance between the sensing components under the conditions including the intensity of the light and the specific exposure time. Moreover, the curve formula includes an intensity attenuation coefficient of the light emitting component or a brightness parameter of the environment where the optical touch apparatus is located.

In one embodiment of the invention, the width detecting method is executed when the optical touch apparatus is re-activated, so as to re-detect the distance between the sensing components.

In one embodiment of the invention, the width detecting method is continuously executed when the optical touch apparatus is in operation, so as to detect the distance between the sensing components at any time.

In one embodiment of the invention, the width detecting method of the optical touch apparatus further includes the following step. The sensing components are respectively disposed on both ends of an expandable support of the optical touch apparatus, and the distance between the sensing components is adjusted by the expandable support.

Based on the above, in the optical touch apparatus according to the above embodiments of the invention, the light emitting component is disposed adjacent to one of the sensing components so as to emit a light, and the intensity of the light is sensed by the other of the sensing components. In this way, the width detecting module automatically determines the distance between the sensing components according to the sensed intensity of the light. Therefore, the optical touch apparatus according to the above embodiments of the invention is applicable to touch planes, touch panels or optical touch apparatuses that have different sizes. In addition, since the optical touch apparatus according to the embodiments of the invention automatically detects the distance between the sensing components, there is no need for a user to manually measure the adjusted distance between the sensing components, or to manually input the manually measured distance between the sensing components to the optical touch apparatus. In this way, the convenience in use is considerably improved.

To make the above features and advantages of the invention more comprehensible, embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Descriptions of the invention are given with reference to the exemplary embodiments illustrated with accompanied drawings, wherein same or similar parts are denoted with same reference numerals. In addition, whenever possible, identical or similar reference numbers stand for identical or similar elements in the figures and the embodiments.

An optical touch apparatus according to the exemplary embodiments of the invention includes at least two sensing components, a light emitting component, and a width detecting module. The at least two sensing components are configured to sense a touch object located on a touch plane. The light emitting component is configured to be a light source of the touch plane and is disposed adjacent to one of the at least two sensing components. The width detecting module is coupled to the light emitting component and the other of the at least two sensing components. The light emitting component is controlled by the width detecting module to emit a light. The other of the at least two sensing components is controlled by the width detecting module to sense intensity of the light. The width detecting module detects a distance between the at least two sensing components according to the sensed intensity of the light.

Figure 1A:
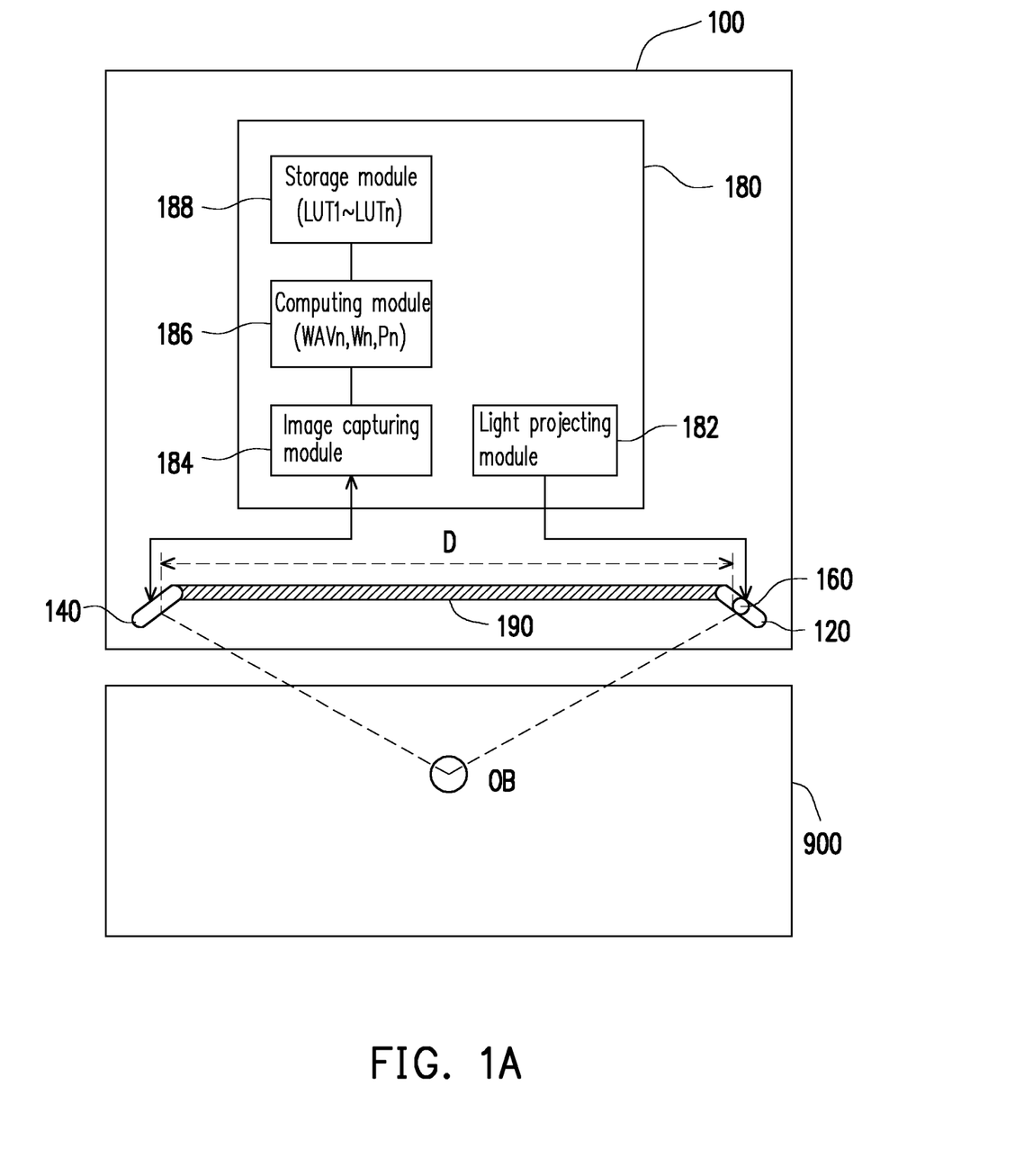
FIG. 1A and FIG. 1B are schematic diagrams illustrating application of an optical touch apparatus to a touch plane according to one embodiment of the invention.
Figure 1B:
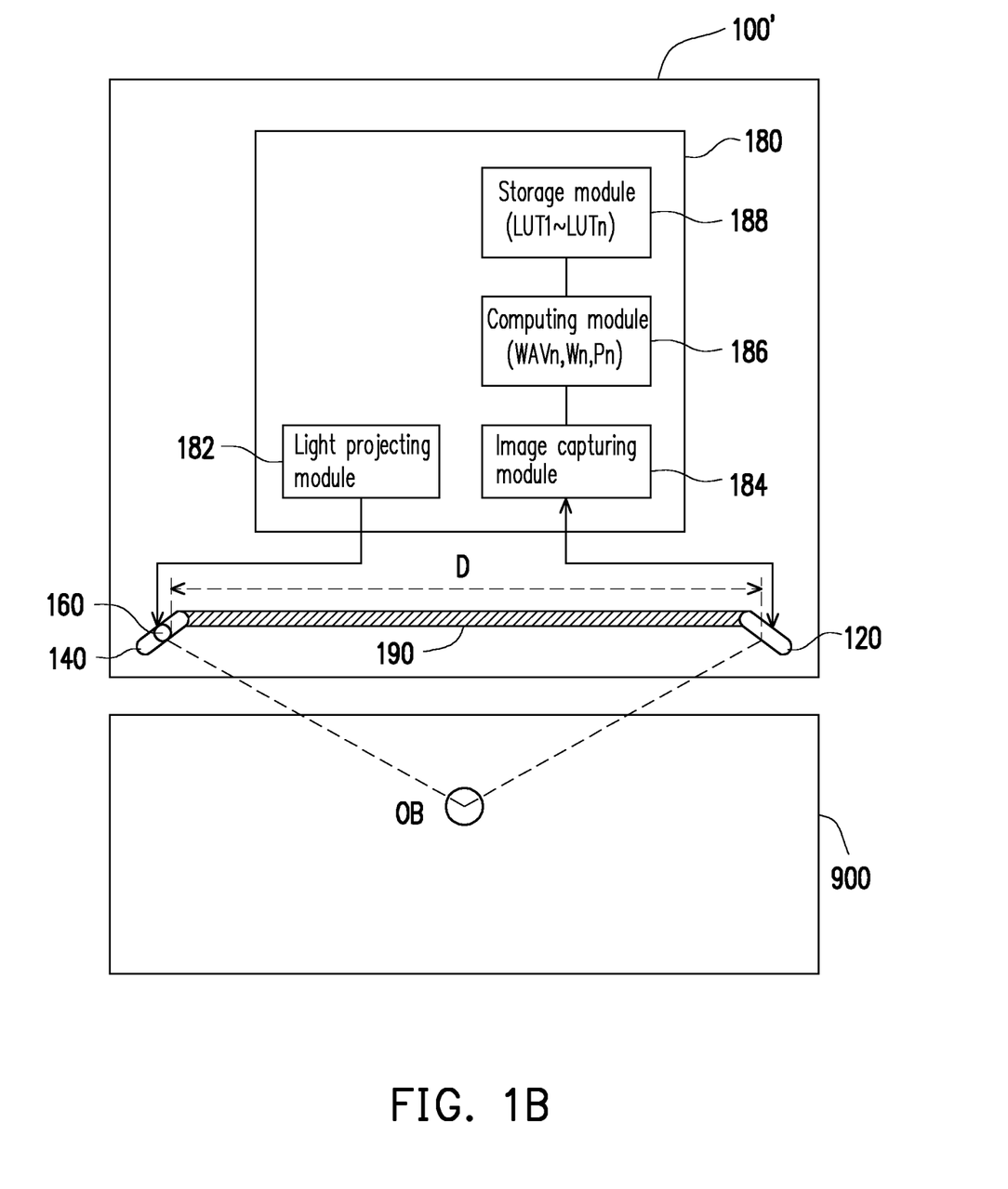

To facilitate illustration, an example with two sensing components will be described below. Embodiments with more than two sensing components can be deduced from the following description. Referring to FIG. 1A and FIG. 1B together, FIG. 1A and FIG. 1B are schematic diagrams illustrating an architecture in which optical touch apparatuses 100 and 100' are applied to a touch plane 900 according to one embodiment of the invention. The optical touch apparatuses 100 and 100' include sensing components 120 and 140, a light emitting component 160, and a width detecting module 180. The sensing components 120 and 140 are configured to sense a touch object OB located on the touch plane 900. The light emitting component 160 is configured to be a light source of the touch plane 900.

In one embodiment of the invention, the sensing components 120 and 140 are, e.g., light sensing components or photographic lenses; the light emitting component 160 is, e.g., a light-emitting diode (LED) source. However, the invention is not limited thereto. Depending on the type of sensing performed by the touch plane 900, the touch object OB may be a reflecting pen, a self-luminous article, or a finger or a touch pen that blocks a backlight source.

The width detecting module 180 may be implemented in the form of hardware, firmware or software. If implemented in hardware, the width detecting module 180 may be achieved by a plurality of circuit chips or by a single integrated circuit chip. However, the embodiments of the invention are not limited thereto. The plurality of circuit chips or the single integrated circuit chip may be implemented by an application-specific integrated circuit (ASIC) or a field-programmable gate array (FPGA). If implemented in firmware or software, the width detecting module 180 may be a software or a machine-executable program code that is stored in a memory and loaded for execution by a processor or a microcontroller. The memory is, e.g., a random-access memory, a read-only memory, a flash memory, or a USB flash drive or the like, and is configured to store the software or the machine-executable program code.

In the exemplary embodiment shown in FIG. 1A, the light emitting component 160 is disposed adjacent to the sensing component 120. For example, the light emitting component 160 and the sensing component 120 may overlap each other vertically or may be disposed horizontally side by side. However, how the light emitting component 160 and the sensing component 120 are adjacent to each other is not limited in the embodiments of the invention. The width detecting module 180 is coupled to the light emitting component 160 and the sensing component 140. The light emitting component 160 is controlled by the width detecting module 180 to emit a light. The sensing component 140 is controlled by the width detecting module 180 to sense intensity of the light emitted by the light emitting component 160. The width detecting module 180 detects a distance D between the sensing components 120 and 140 according to the intensity of the light sensed by the sensing component 140.

It can be understood that in the exemplary embodiment shown in FIG. 1A, a light is emitted by the light emitting component 160 disposed on an upper right side of the touch plane 900, and the intensity of the light emitted by the light emitting component 160 is sensed by the sensing component 140 disposed on an upper left side of the touch plane 900. However, the invention is not limited thereto. In the exemplary embodiment shown in FIG. 1B, the light emitting component 160 is disposed adjacent to the sensing component 140. For example, the light emitting component 160 and the sensing component 140 may overlap each other vertically or may be disposed horizontally side by side. However, the invention is not limited thereto. The width detecting module 180 is coupled to the light emitting component 160 and the sensing component 120. The light emitting component 160 is controlled by the width detecting module 180 to emit a light. The sensing component 120 is controlled by the width detecting module 180 to sense intensity of the light emitted by the light emitting component 160. The width detecting module 180 detects the distance D between the sensing components 120 and 140 according to the intensity of the light sensed by the sensing component 120. It can be understood that in the exemplary embodiment shown in FIG. 1B, a light is emitted by the light emitting component 160 disposed on the upper left side of the touch plane 900, and the intensity of the light emitted by the light emitting component 160 is sensed by the sensing component 120 disposed on the upper right side of the touch plane 900.

Since the architecture and operation manner of the optical touch apparatus 100' shown in FIG. 1B are similar to those of the optical touch apparatus 100 shown in FIG. 1A, hereinafter, only the optical touch apparatus 100 shown in FIG. 1A is described in detail, and the architecture and operation manner of the optical touch apparatus 100' shown in FIG. 1B can be inferred by analogy from the relevant description of FIG. 1A.

Referring again to FIG. 1A, the optical touch apparatus 100 further includes an expandable support 190, wherein the sensing components 120 and 140 are respectively disposed on both ends of the expandable support 190. In this way, the distance D between the sensing components 120 and 140 is adjusted by the expandable support 190, which renders the optical touch apparatus 100 applicable to the touch plane 900 of different sizes. However, the invention is not limited thereto. In other embodiments of the invention, the sensing components 120 and 140 may be directly disposed on both ends on one side (e.g., but not limited to, the upper side) of the touch plane 900 of different sizes, and rotation angles of the sensing components 120 and 140 are fixed. In this way, there is no need to adjust the distance D between the sensing components 120 and 140 by the expandable support 190.

Figure 2A:
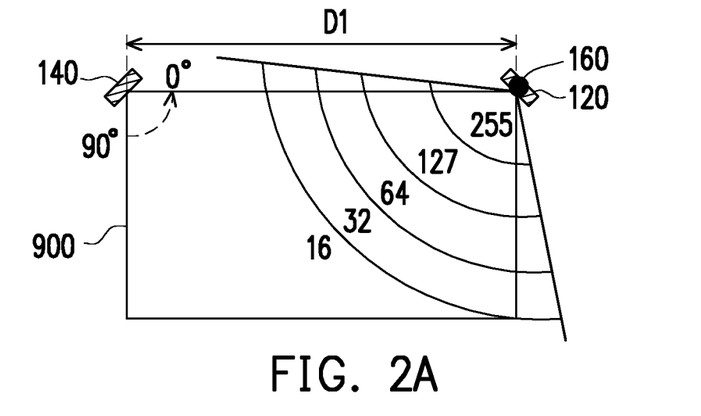
FIG. 2A is a schematic scenario diagram illustrating installation positions of a sensing component and a light emitting component in the optical touch apparatus shown in FIG. 1A.
Figure 2B:
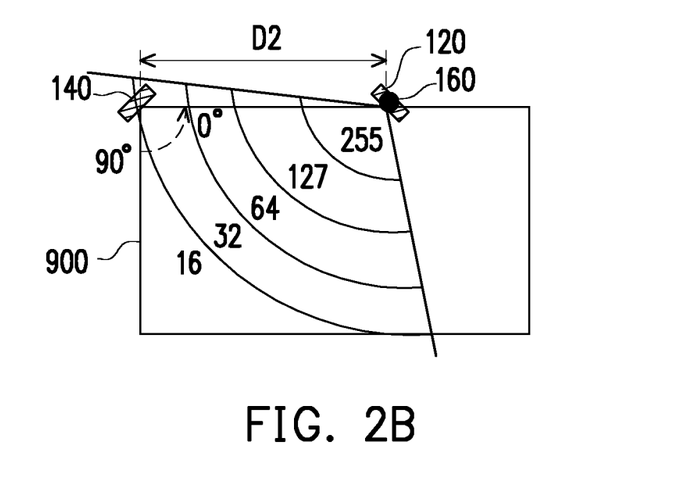
FIG. 2B is another schematic scenario diagram illustrating the installation positions of the sensing component and the light emitting component in the optical touch apparatus shown in FIG. 1A.
Figure 2C:
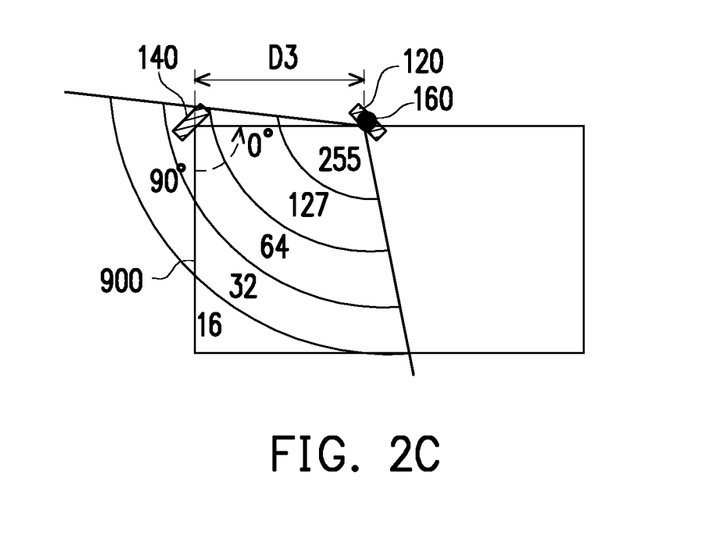
FIG. 2C is still another schematic scenario diagram illustrating the installation positions of the sensing component and the light emitting component in the optical touch apparatus shown in FIG. 1A.

Referring to FIG. 1A and FIGS. 2A to 2C together, FIG. 2A is a schematic scenario diagram illustrating installation positions of the sensing components 120, 140 and the light emitting component 160 in the optical touch apparatus 100 shown in FIG. 1A. FIG. 2B is another schematic scenario diagram illustrating the installation positions of the sensing components 120, 140 and the light emitting component 160 in the optical touch apparatus 100 shown in FIG. 1A. FIG. 2C is still another schematic scenario diagram illustrating the installation positions of the sensing components 120, 140 and the light emitting component 160 in the optical touch apparatus 100 shown in FIG. 1A. It should be noted that, a distance D1 between the sensing components 120 and 140 shown in FIG. 2A is greater than a distance D2 between the sensing components 120 and 140 shown in FIG. 2B, and the distance D2 between the sensing components 120 and 140 shown in FIG. 2B is greater than a distance D3 between the sensing components 120 and 140 shown in FIG. 2C.

The light emitting component 160 disposed adjacent to the sensing component 120 is configured to emit a light having specific light intensity. A view angle of the sensing component 140 is, e.g., 90 degree. However, the invention is not limited thereto. In other embodiments of the invention, the view angle of the sensing component 140 may be greater than 90 degree. It should be noted that, the intensity of the light sensed by the sensing component 140 decreases as the distance D1, D2 or D3 between the sensing component 140 and the sensing component 120 (or the light emitting component 160) increases. For example, the intensity value of the light sensed by the sensing component 140 in FIG. 2A is 16 candela, the intensity value of the light sensed by the sensing component 140 in FIG. 2B is 32 candela, and the intensity value of the light sensed by the sensing component 140 in FIG. 2C is 64 candela.

Figure 3A:
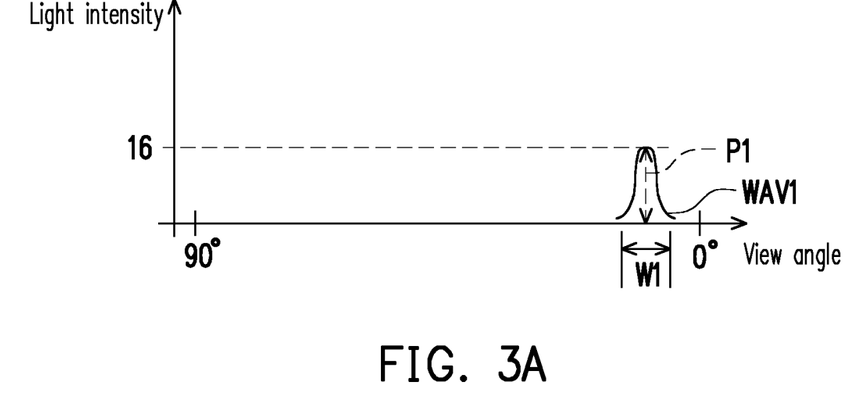
FIG. 3A is a schematic diagram illustrating a relationship between a view angle of the sensing component in FIG. 2A and an intensity value (light intensity) of light sensed by the sensing component.
Figure 3B:
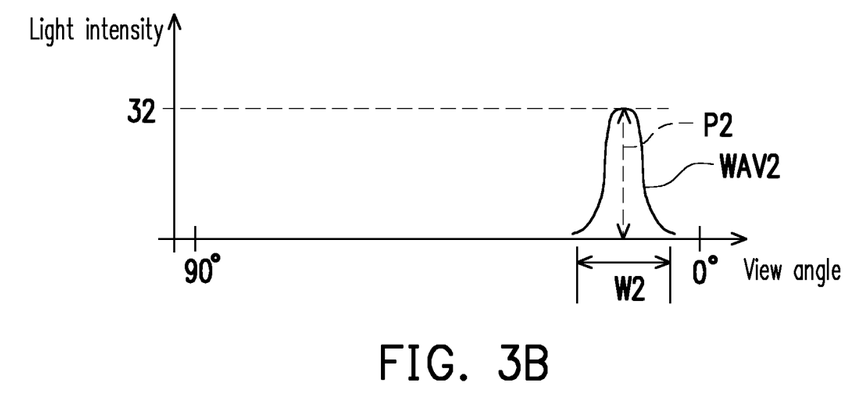
FIG. 3B is a schematic diagram illustrating a relationship between a view angle of the sensing component in FIG. 2B and the intensity value of light sensed by the sensing component.
Figure 3C:
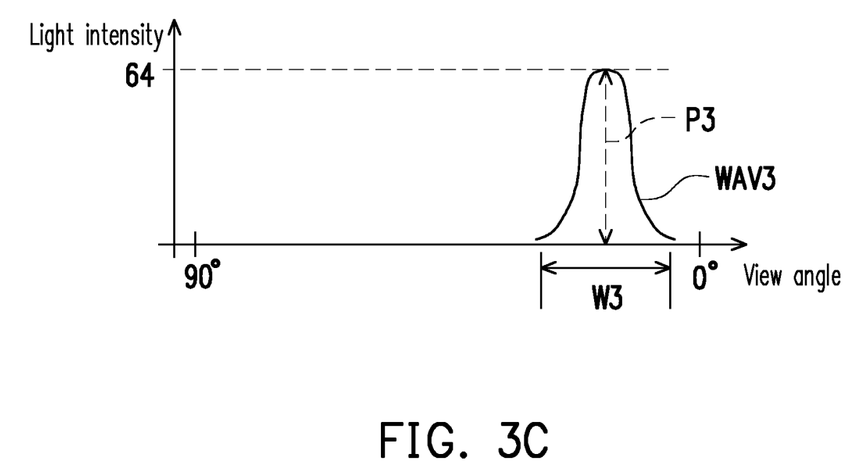
FIG. 3C is a schematic diagram illustrating a relationship between a view angle of the sensing component in FIG. 2C and the intensity value of light sensed by the sensing component.

Please refer to FIG. 1A, FIGS. 2A to 2C and FIGS. 3A to 3C together. FIG. 3A is a schematic diagram illustrating a relationship between the view angle of the sensing component 140 in FIG. 2A and the intensity value (light intensity) of the light sensed by the sensing component 140. FIG. 3B is a schematic diagram illustrating a relationship between the view angle of the sensing component 140 in FIG. 2B and the intensity value of the light sensed by the sensing component 140. FIG. 3C is a schematic diagram illustrating a relationship between the view angle of the sensing component 140 in FIG. 2C and the intensity value of the light sensed by the sensing component 140. Peak values P1, P2 and P3 of waveforms WAV1, WAV2 and WAV3 shown in FIGS. 3A to 3C are respectively intensity values of the light sensed by the sensing component 140. Widths W1, W2 and W3 of the waveforms WAV1, WAV2 and WAV3 are view angle ranges in which the intensity values of the light sensed by the sensing component 140 are not zero.

For example, the peak value P1 of the waveform WAV1 shown in FIG. 3A is 16 (corresponding to the intensity value of the light sensed by the sensing component 140 in FIG. 2A being 16), the peak value P2 of the waveform WAV2 shown in FIG. 3B is 32 (corresponding to the intensity value of the light sensed by the sensing component 140 in FIG. 2B being 32), and the peak value P3 of the waveform WAV3 shown in FIG. 3C is 64 (corresponding to the intensity value of the light sensed by the sensing component 140 in FIG. 2C being 64). In addition, the width W1 of the waveform WAV1 shown in FIG. 3A is smaller than the width W2 of the waveform WAV2 shown in FIG. 3B, and the width W2 of the waveform WAV2 shown in FIG. 3B is smaller than the width W3 of the waveform WAV3 shown in FIG. 3C. In other words, the greater the distances D1, D2 and D3 between the sensing component 140 and the sensing component 120 (or the light emitting component 160), the weaker the intensity of the light sensed by the sensing component 140, and the smaller the widths W1, W2 and W3 of the waveforms WAV1, WAV2 and WAV3. Based on the above, the optical touch apparatus 100 obtains the distances D1, D2 and D3 between the sensing components 120 and 140 according to the widths W1, W2 and W3 or the peak values P1, P2 and P3 of the waveforms WAV1, WAV2 and WAV3.

The width detecting module 180 is described below. Referring again to FIG. 1A, the width detecting module 180 includes a light projecting module 182, an image capturing module 184 and a computing module 186. The light projecting module 182, the image capturing module 184 and the computing module 186 may be implemented in the form of hardware, firmware or software. If implemented in hardware, the light projecting module 182, the image capturing module 184 and the computing module 186 each may be achieved by a plurality of circuit chips or by a single integrated circuit chip. However, the invention is not limited thereto. The plurality of circuit chips or the single integrated circuit chip may be implemented by an application-specific integrated circuit (ASIC) or a field-programmable gate array (FPGA). If implemented in firmware or software, the light projecting module 182, the image capturing module 184 and the computing module 186 may be software or machine-executable program codes stored in a memory and loaded for execution by a processor or a microcontroller. The memory is, e.g., a random-access memory, a read-only memory, a flash memory, or a USB flash drive or the like, and is configured to store the software or the machine-executable program codes.

The light projecting module 182 is coupled to the light emitting component 160 so as to control the light emitting component 160 to emit a light. The image capturing module 184 is coupled to the sensing component 140. The image capturing module 184 is configured to control the sensing component 140 to reflect the intensity of the light to obtain an image. The computing module 186 is coupled to the image capturing module 184 so as to receive the image. The computing module 186 calculates a width Wn or a peak value Pn of a waveform WAVn according to the image, and obtains the distance D between the sensing components 120 and 140 according to the width Wn or the peak value Pn of the waveform WAVn. As described above, the peak value Pn of the waveform WAVn is the intensity of the light sensed by the sensing component 140, and the width Wn of the waveform WAVn is the view angle range in which the sensed intensity of the light is not zero.

Furthermore, in designing the optical touch apparatus 100, the light projecting module 182 is used to control the light emitting component 160 to emit a light having specific light intensity, the image capturing module 184 is used to control a specific exposure time of the sensing component 140, and the computing module 186 is used to record widths (e.g., the widths W1, W2 and W3) or peak values (e.g., the peak values P1, P2 and P3) of waveforms (e.g., the waveforms WAV1, WAV2 and WAV3) with respect to different distances (e.g., the distances D1, D2 and D3 shown in FIGS. 2A to 2C), so as to establish a lookup table LUT1 in advance. In this way, when the optical touch apparatus 100 is in operation, the computing module 186 looks up in the lookup table LUT1 or calculates the distance D between the sensing components 120 and 140 according to the width Wn or the peak value Pn of the waveform WAVn.

For example, when the optical touch apparatus 100 is in operation, if the width Wn (or the peak value Pn) of the waveform WAVn calculated by the computing module 186 is substantially equal to W1 (or P1), the computing module 186 looks up in the lookup table LUT1 to obtain that the distance D between the sensing components 120 and 140 is D1. Accordingly, the optical touch apparatus 100 detects a precise position of the touch object OB through triangulation based on the fact that the distance D between the sensing components 120 and 140 is D1 as well as angles between the sensing components 120, 140 and the touch object OB.

On the other hand, if the width Wn (or the peak value Pn) of the waveform WAVn calculated by the computing module 186 falls between the width W1 (or the peak value P1) and the width W2 (or the peak value P2), the computing module 186 looks up in the lookup table LUT1 to obtain that the distance corresponding to the width W1 (or the peak value P1) is D1 and that the distance corresponding to the width W2 (or the peak value P2) is D2, and then calculates the distance D between the sensing components 120 and 140 by an interpolation method.

It should be noted that the light emitting component 160 may age as a number of times of use (or a number of years of use) of the optical touch apparatus 100 increases. Therefore, the intensity of the light emitted by the light emitting component 160 may be attenuated as the number of times of use (or the number of years of use) of the optical touch apparatus 100 increases. In other words, the number of times of use of the optical touch apparatus 100 is associated with a degree of attenuation in the intensity of the light emitting component 160. In this way, precision of the distance D between the sensing components 120 and 140 detected by the width detecting module 180 may be affected by the degree of attenuation in the intensity of the light emitting component 160. In order to solve this issue, in designing the optical touch apparatus 100, a plurality of lookup tables LUT1 to LUTn are established in advance, wherein the lookup tables LUT1 to LUTn respectively correspond to different numbers of times of use (or numbers of years of use). For example, when the number of times of use of the optical touch apparatus 100 is smaller than 100 (or the number of years of use is smaller than 1), the computing module 186 obtains the distance D between the sensing components 120 and 140 by looking up in the lookup table LUT1. When the number of times of use of the optical touch apparatus 100 is between 100 and 200 (or the number of years of use is between 1 and 2), the computing module 186 obtains the distance D between the sensing components 120 and 140 by looking up in the lookup table LUT2. The rest can be deduced by analogy and thus details thereof are omitted.

In addition, brightness of the environment where the optical touch apparatus 100 is located may affect the precision of the distance D between the sensing components 120 and 140 detected by the width detecting module 180. Thus, in another embodiment of the invention, the lookup tables LUT1 to LUTn respectively correspond to different ambient brightnesses. Particularly, the ambient brightness is obtained by sensing performed by the sensing component 120 or the sensing component 140 with respect to the environment where the optical touch apparatus 100 is located.

In one embodiment of the invention, the lookup tables LUT1 to LUTn may be built in the computing module 186. However, the invention is not limited thereto. In other embodiments of the invention, the width detecting module 180 further includes a storage module 188. The storage module 188 is coupled to the computing module 186 and is configured to store the lookup tables LUT1 to LUTn. In one embodiment of the invention, the storage module 188 is, e.g., a read-only memory or a flash memory. However, the invention is not limited thereto.

In another embodiment of the invention, the computing module 186 substitutes the width Wn or the peak value Pn of the waveform WAVn into a curve formula FUN so as calculate the distance D between the sensing components 120 and 140.

Furthermore, in designing the optical touch apparatus 100, the light projecting module 182 is used to control the light emitting component 160 to emit a light having specific light intensity, the image capturing module 184 is used to control a specific exposure time of the sensing component 140, and the computing module 186 is used to record widths (e.g., the widths W1, W2 and W3) or peak values (e.g., the peak values P1, P2 and P3) of waveforms (e.g., the waveforms WAV1, WAV2 and WAV3) with respect to different distances (e.g., the distances D1, D2 and D3 shown in FIGS. 2A to 2C), so as to calculate the curve formula FUN in advance. In other words, the curve formula FUN is an expression showing the relationship between the width (e.g., the widths W1, W2 and W3) or peak value (e.g., the peak values P1, P2 and P3) of the waveform (e.g., the waveforms WAV1, WAV2 and WAV3) and the distance (e.g., the distances D1, D2 and D3) between the sensing components 120 and 140. In this way, when the optical touch apparatus 100 is in operation, the computing module 186 substitutes the width Wn or the peak value Pn of the waveform WAVn into the curve formula FUN so as calculate the distance D between the sensing components 120 and 140. Next, the optical touch apparatus 100 detects the precise position of the touch object OB through triangulation based on the distance D between the sensing components 120 and 140 as well as the angles between the sensing components 120, 140 and the touch object OB.

It should be noted that the light emitting component 160 may age as the number of times of use (or the number of years of use) of the optical touch apparatus 100 increases. In other words, the intensity of the light emitted by the light emitting component 160 may be attenuated as the number of times of use (or the number of years of use) of the optical touch apparatus 100 increases. In this way, the precision of the distance D between the sensing components 120 and 140 detected by the width detecting module 180 may be affected by the degree of attenuation in the intensity of the light emitting component 160. Therefore, the curve formula FUN includes an intensity attenuation coefficient P of the light emitting component 160, wherein different numbers of times of use (or numbers of years of use) correspond to different intensity attenuation coefficients P. For example, when the number of times of use of the optical touch apparatus 100 is smaller than 100 (or the number of years of use is smaller than 1), the computing module 186 calculates the distance D between the sensing components 120 and 140 by setting the intensity attenuation coefficient P to a numerical value PV1. When the number of times of use of the optical touch apparatus 100 is between 100 and 200 (or the number of years of use is between 1 and 2), the computing module 186 calculates the distance D between the sensing components 120 and 140 by setting the intensity attenuation coefficient P to a numerical value PV2. The rest can be deduced by analogy and thus details thereof are omitted.

Figure 4A:
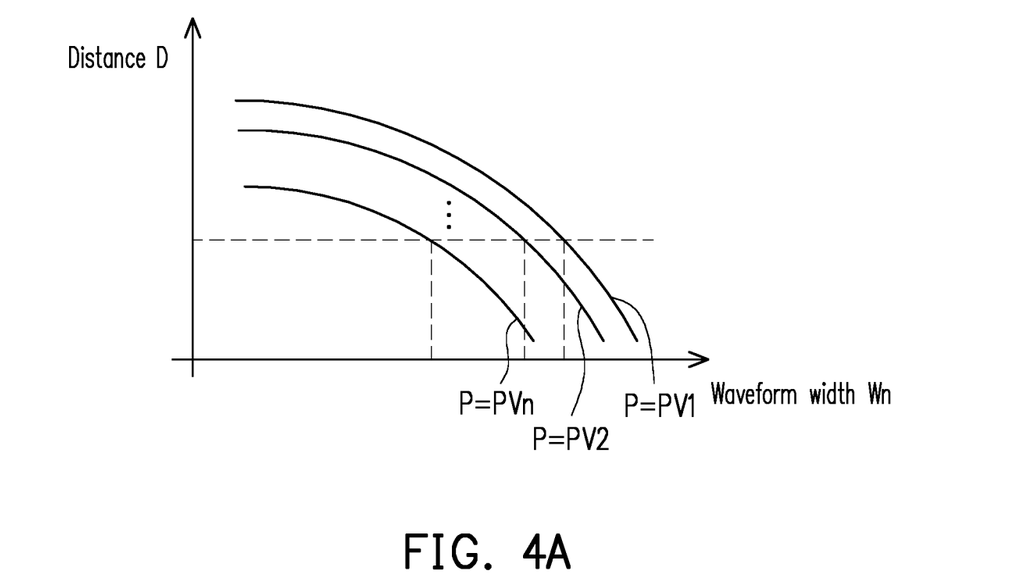
FIG. 4A is a schematic diagram illustrating a relationship between a distance between the sensing components and a width of a waveform under different intensity attenuation coefficients.
Figure 4B:
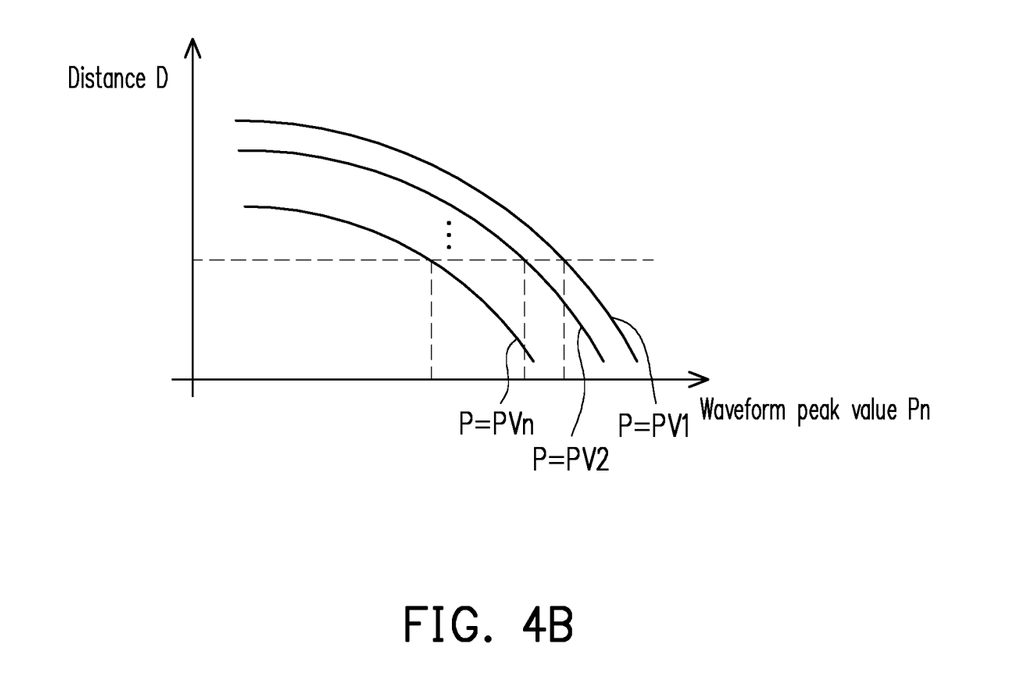
FIG. 4B is a schematic diagram illustrating a relationship between the distance between the sensing components and a peak value of a waveform under different intensity attenuation coefficients.

Referring to FIG. 1A, FIG. 4A and FIG. 4B together, FIG. 4A is a schematic diagram illustrating a relationship between the distance D between the sensing components 120 and 140 and the width Wn of the waveform WAVn under different intensity attenuation coefficients P, and FIG. 4B is a schematic diagram illustrating a relationship between the distance D between the sensing components 120 and 140 and the peak value Pn of the waveform WAVn under different intensity attenuation coefficients P. As described above, the width Wn or the peak value Pn of the waveform WAVn corresponds to the intensity of the light sensed by the sensing component 140. Thus, it can be understood that, when the distance D between the sensing components 120 and 140 remains unchanged, the intensity of the light sensed by the sensing component 140 decreases as the number of times of use (or the number of years of use) of the light emitting component 160 increases, as shown in FIG. 4A and FIG. 4B.

In addition, the brightness of the environment where the optical touch apparatus 100 is located may also affect the precision of the distance D between the sensing components 120 and 140 detected by the width detecting module 180. Thus, in another embodiment of the invention, the curve formula FUN further includes a brightness parameter of the environment where the optical touch apparatus 100 is located. Particularly, the brightness parameter is obtained by sensing performed by the sensing component 120 or the sensing component 140 with respect to the environment where the optical touch apparatus 100 is located.

In one embodiment of the invention, when the optical touch apparatus 100 is re-activated, the width detecting module 180 re-detects the distance D between the sensing components 120 and 140. In this way, when the user adjusts the distance D between the sensing components 120 and 140 in the optical touch apparatus 100 and re-activates the optical touch apparatus 100, the width detecting module 180 automatically detects the distance D between the sensing components 120 and 140.

In another embodiment of the invention, when the optical touch apparatus 100 is in operation, the width detecting module 180 continuously detects the distance D between the sensing components 120 and 140. In this way, even if the user adjusts the distance D between the sensing components 120 and 140 during operation of the optical touch apparatus 100, the width detecting module 180 is capable of automatically detecting the adjusted distance D between the sensing components 120 and 140 at any time.

Figure 5:
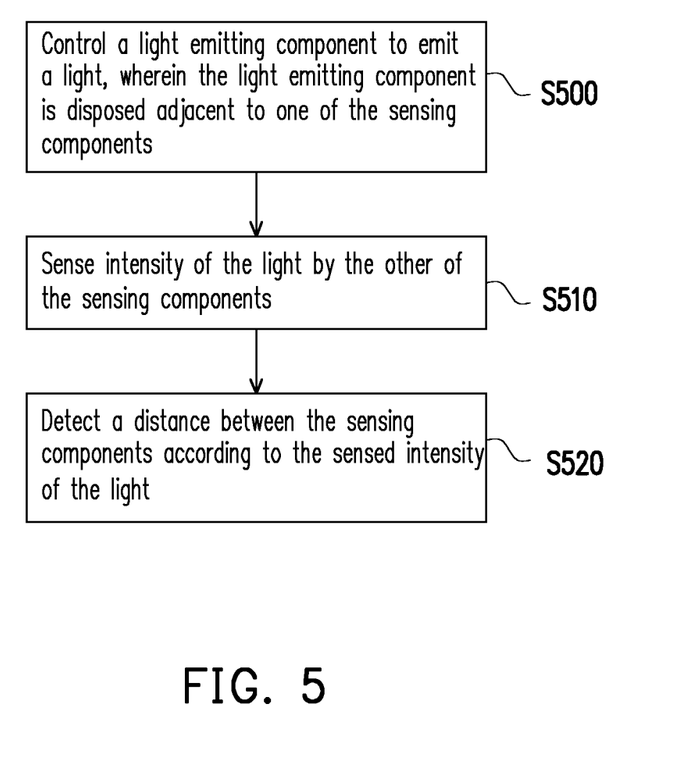
FIG. 5 is a flowchart illustrating steps of a width detecting method of an optical touch apparatus according to one embodiment of the invention.

FIG. 5 is a flowchart illustrating steps of a width detecting method of an optical touch apparatus according to one embodiment of the invention. Referring to FIG. 1A and FIG.

5 together, as described above, the sensing components 120 and 140 are configured to sense the touch object OB located on the touch plane 900. The light emitting component 160 is configured to be the light source of the touch plane 900. The width detecting method of the optical touch apparatus 100 according to the exemplary embodiments of the invention includes the following steps. First, in step S500, the light emitting component 160 is controlled to emit a light, wherein the light emitting component 160 is disposed adjacent to one (e.g., the sensing component 120 shown in FIG. 1A) of the sensing components. Next, in step S510, intensity of the light is sensed by the other (e.g., the sensing component 140 shown in FIG. 1A) of the sensing components. Then, in step S520, a distance between the sensing components (e.g., the sensing components 120 and 140 shown in FIG. 1A) is detected according to the sensed intensity of the light.

In addition, regarding the width detecting method of the optical touch apparatus according to the embodiments of the invention, sufficient teaching, suggestion, and implementation illustration can be obtained from the descriptions of the embodiments shown in the above drawings, and thus details thereof are omitted.

In summary, in the optical touch apparatus according to the above embodiments of the invention, the light emitting component is disposed adjacent to one of the sensing components so as to emit a light, and the intensity of the light is sensed by the other of the sensing components. In this way, the width detecting module automatically determines the distance between the sensing components according to the sensed intensity of the light. Therefore, the optical touch apparatus according to the above embodiments of the invention is applicable to touch planes, touch panels or optical touch apparatuses that have different sizes. In addition, since the optical touch apparatus according to the embodiments of the invention automatically detects the distance between the sensing components, there is no need for the user to manually measure the adjusted distance between the sensing components, or to manually input the manually measured distance between the sensing components to the optical touch apparatus. In this way, the convenience in use is considerably improved.

Although the invention has been described with reference to the above embodiments, it will be apparent to persons of ordinary skill in the art that modifications to the described embodiments may be made without departing from the spirit of the invention. Accordingly, the scope of the invention will be defined by the attached claims and not by the above detailed descriptions.

What is claimed is:

1. An optical touch apparatus, comprising:
at least two sensing components, configured to sense a touch object located on a touch plane;
a light emitting component, configured to be a light source of the touch plane and disposed adjacent to one of the at least two sensing components; and
a width detecting module, coupled to the light emitting component and the other of the at least two sensing components,
wherein the light emitting component is controlled by the width detecting module to emit a light, the other of the at least two sensing components is controlled by the width detecting module to sense intensity of the light, and the width detecting module detects a distance between the at least two sensing components according to the sensed intensity of the light and at least one number of times of use of the optical touch apparatus associated with a degree of attenuation in intensity of the light emitting component or according to the sensed intensity of the light and at least one ambient brightness of an environment where the optical touch apparatus is located,
wherein the width detecting module comprises:
an image capturing module, coupled to the other of the at least two sensing components so as to control the other of the at least two sensing components to reflect the intensity of the light to obtain an image; and
a computing module, coupled to the image capturing module so as to receive the image, calculating a peak value of a waveform according to the image, and obtaining the distance between the at least two sensing components according to the peak value of the waveform,
wherein the computing module looks up in at least one lookup table or calculates the distance between the at least two sensing components according to the peak value of the waveform,
wherein the at least one lookup table is configured to record a relationship between the peak value of the waveform and the distance between the at least two sensing components in a situation with the intensity of the light and a specific exposure time,
wherein the at least one lookup table corresponds to the at least one number of times of use of the optical touch apparatus or the at least one ambient brightness of the environment where the optical touch apparatus is located.

2. The optical touch apparatus of claim 1, wherein the width detecting module comprises:
a light projecting module, coupled to the light emitting component so as to control the light emitting component to emit the light,
wherein the peak value of the waveform is the sensed intensity of the light.

3. The optical touch apparatus of claim 1, wherein the width detecting module further comprises:
a storage module, coupled to the computing module and configured to store the at least one lookup table.

4. The optical touch apparatus of claim 2, wherein:
the computing module substitutes the peak value of the waveform into a curve formula so as calculate the distance between the at least two sensing components,
wherein the curve formula is an expression showing a relationship between the peak value of the waveform and the distance between the at least two sensing components under conditions comprising the intensity of the light and a specific exposure time, and the curve formula comprises an intensity attenuation coefficient of the light emitting component or a brightness parameter of an environment where the optical touch apparatus is located.

5. The optical touch apparatus of claim 1, wherein:
when the optical touch apparatus is activated after the optical touch apparatus has been de-activated, the width detecting module re-detects the distance between the at least two sensing components.

6. The optical touch apparatus of claim 1, wherein:
when the optical touch apparatus is in operation, the width detecting module continuously detects the distance between the at least two sensing components.

7. The optical touch apparatus of claim 1, further comprising:
an expandable support, wherein the at least two sensing components are respectively disposed on both ends of the expandable support, and the expandable support is configured to adjust the distance between the at least two sensing components.

8. A width detecting method of an optical touch apparatus, wherein at least two sensing components of the optical touch apparatus are configured to sense a touch object located on a touch plane, and a light emitting component of the optical touch apparatus is configured to be a light source of the touch plane, the width detecting method comprising:
controlling the light emitting component to emit a light, wherein the light emitting component is disposed adjacent to one of the at least two sensing components;
sensing intensity of the light by the other of the at least two sensing components; and
detecting a distance between the at least two sensing components according to the sensed intensity of the light and at least one number of times of use of the optical touch apparatus associated with a degree of attenuation in intensity of the light emitting component or according to the sensed intensity of the light and at least one ambient brightness of an environment where the optical touch apparatus is located,
wherein the step of sensing the intensity of the light by the other of the at least two sensing components comprises:
controlling the other of the at least two sensing components to reflect the intensity of the light to obtain an image,
wherein the step of detecting the distance between the at least two sensing components according to the sensed intensity of the light comprises:
calculating a peak value of a waveform according to the image; and
obtaining the distance between the at least two sensing components according to the peak value of the waveform,
wherein the step of obtaining the distance between the at least two sensing components according to the width of the waveform comprises:
looking up in at least one lookup table or calculating the distance between the at least two sensing components according to the peak value of the waveform,
wherein the method further comprising:
wherein the at least one lookup table is configured to record a relationship between the peak value of the waveform and the distance between the at least two sensing components in a situation with the intensity of the light and a specific exposure time,
wherein the at least one lookup table corresponds to the at least one number of times of use of the optical touch apparatus or the at least one ambient brightness of the environment where the optical touch apparatus is located.

9. The width detecting method of an optical touch apparatus of claim 8, wherein the step of sensing the intensity of the light by the other of the at least two sensing components comprises:
controlling the other of the at least two sensing components to reflect the intensity of the light to obtain an image,
wherein the step of detecting the distance between the at least two sensing components according to the sensed intensity of the light comprises:
calculating a peak value of a waveform according to the image; and
obtaining the distance between the at least two sensing components according to the peak value of the waveform,
wherein the peak value of the waveform is the sensed intensity of the light.

10. The width detecting method of an optical touch apparatus of claim 8, further comprising:
establishing and storing the at least one lookup table in advance.

11. The width detecting method of an optical touch apparatus of claim 9, wherein the step of obtaining the distance between the at least two sensing components according to the peak value of the waveform comprises:
substituting the peak value of the waveform into a curve formula so as calculate the distance between the at least two sensing components,
wherein the curve formula is an expression showing a relationship between the peak value of the waveform and the distance between the at least two sensing components under conditions comprising the intensity of the light and a specific exposure time, and the curve formula comprises an intensity attenuation coefficient of the light emitting component or a brightness parameter of an environment where the optical touch apparatus is located.

12. The width detecting method of an optical touch apparatus of claim 8, wherein the width detecting method is executed when the optical touch apparatus is activated after the optical touch apparatus has been de-activated so as to re-detect the distance between the at least two sensing components.

13. The width detecting method of an optical touch apparatus of claim 8, wherein the width detecting method is continuously executed when the optical touch apparatus is in operation so as to detect the distance between the at least two sensing components at any time.

14. The width detecting method of an optical touch apparatus of claim 8, further comprising:
disposing the at least two sensing components respectively on both ends of an expandable support of the optical touch apparatus, and adjusting the distance between the at least two sensing components by the expandable support.

* * * * *